March 10, 1931. C. M. ALEXANDER 1,796,135
GAS AND LIQUID CONTACT APPARATUS
Filed March 17, 1928 5 Sheets-Sheet 1

INVENTOR
Clive M. Alexander
BY
Pennie, Davis, Marvin & Edmonds
ATTORNEYS

March 10, 1931. C. M. ALEXANDER 1,796,135
GAS AND LIQUID CONTACT APPARATUS
Filed March 17, 1928   5 Sheets-Sheet 2

INVENTOR
Clive M. Alexander
BY
Pennie, Davis, Marvin & Edmonds
ATTORNEYS

March 10, 1931. C. M. ALEXANDER 1,796,135
GAS AND LIQUID CONTACT APPARATUS
Filed March 17, 1928   5 Sheets-Sheet 3

INVENTOR
Clive M. Alexander
BY
Pennie, Davis, Marvin & Edmonds
ATTORNEYS

March 10, 1931.  C. M. ALEXANDER  1,796,135
GAS AND LIQUID CONTACT APPARATUS
Filed March 17, 1928   5 Sheets-Sheet 4

INVENTOR
Clive M. Alexander
BY
Pennie, Davis, Marvin & Edmonds
ATTORNEYS

Patented Mar. 10, 1931

1,796,135

UNITED STATES PATENT OFFICE

CLIVE M. ALEXANDER, OF TULSA, OKLAHOMA

GAS AND LIQUID CONTACT APPARATUS

Application filed March 17, 1928. Serial No. 262,343.

This invention relates to gas and liquid or vapor and liquid contact apparatus. More particularly the present invention relates to improved bubble towers such as are used for fractionating towers, absorbing towers, scrubbing towers and the like where it is desired to intimately contact a vapor or gas with a liquid. The invention also includes an improved bubble tray which may be advantageously employed in the improved bubble tower of the invention, but which may also be advantageously adapted to other types of gas and liquid or vapor and liquid contact apparatus. This application is in part a continuation of my application Serial No. 151,067, filed November 27, 1926, which matured into Patent No. 1,667,136 on April 24, 1928.

Towers for these several purposes are commonly made up of a series of pans or trays in each of which a number of upwardly directed nipples are arranged, caps being arranged over the nipples to compel gases or vapors rising through the nipple to bubble under the rim or through openings in the side walls of the cap through a pool of liquid maintained at a predetermined depth on the pan or tray. Overflow connections are also provided to maintain a liquid level at or above the upper edge of the openings in the bubble caps through which the gases or vapors are discharged and to permit excess liquid to pass to the next lower pan or tray in the series, but to form a seal preventing the gases or vapors from passing upwardly therethrough to the next higher pan or tray in the series.

Various arrangements of trays and overflow connections have been employed, in some of which the overflow connections for adjacent trays were arranged on opposite sides of the tower so that the liquid entering from the next higher tray is required to flow across the full width of the pan or tray before being permitted to pass to the next lower pan or tray of the series. Another arrangement sometimes employed is to provide the overflow connections from successive pans or trays near the same side of the bubble tower but on opposite sides of a lateral baffle so arranged on the upper surfaces of the trays that the liquid will be required to flow across any one tray in one direction on one side of the baffle and in the opposite direction on the other side, the liquid thereafter passing to the next lower pan or tray of the series where it flows across the next tray in a similar manner but in the opposite direction across corresponding parts of the tray. Still another arrangement frequently employed is to dispose the overflow connections between all of the pans or trays on the same side of the bubble tower without employing any baffling means on the upper surfaces of the tray.

The former two arrangements have the advantage of preventing the formation of dead spots, a condition common in towers with the latter arrangement, in which parts of the liquid body on the upper surfaces of the tray more remote from the overflow connections are permitted to remain for a considerable period of time, becoming increasingly saturated with absorbable or condensable constituents, while parts of the liquid body nearest the overflow connections are continually replenished with fresh liquid from a higher tray, the excess liquid passing to the next lower tray being less saturated with the absorbable or condensable constituents from the gas or vapor than that liquid standing in the so-called dead spots, and insures a substantially uniform amount of contact between the gas or vapor and all parts of the liquid stream whereby liquid passing across the trays becomes progressively saturated.

The two first named arrangements, however, have the disadvantage that while the liquid passing downwardly through the tower contains a progressively increasing amount of absorbable constituents, or, as in the case of a fractionating tower, a progressively increasing amount of higher boiling and decreasing amount of lower boiling constituents so that the composition of the liquid entering consecutive trays differs by approximately equal increments, the composition of the liquid in any two successive trays near the position of the overflow connection between them is approximately the same while at the opposite extremity of the path of the liquid across the trays the composition of the liquids in the same pair of trays differs by a much greater increment than that of the liquid entering any two adjacent trays.

With this condition existing, the gas or vapor passing upwardly through the tower in the region adjoining the overflow connections is contacted in alternate trays with liquid of substantially the same composition, temperature, or degree of saturation as it encountered at the corresponding point in the previous tray so that only a slight additional amount of absorption or condensation may be expected as a result of the second contacting. The efficiency of the tower as an absorber or condenser is therefore greatly reduced as a considerable portion of each tray is of little or no utility. The accuracy of fractionation which may be secured is also greatly impaired due to the irregular gradient of the composition of the liquid with which the gases or vapors are contacted and the consequent irregular gradient in the partial pressure of any one constituent of the vapors in passing through the tower.

This invention provides an improved bubble tower of especial value in operations of the type above described. With the improved bubble tower of the invention it is possible to conduct fractionation or absorbing operations so that a uniform gradient of composition of liquid is maintained between corresponding parts of the liquid body on each of the consecutive trays of the series and at the same time prevent the formation of dead spots in the liquid body on any one tray. The improved bubble tower of the invention promotes the distribution and circulation of the liquid over all parts of the trays or pans and makes all sections become substantially equal in their effectiveness in removing the absorbable and condensable constituents from the gas or vapor subjected to the absorbing or condensing operation. The capacity of the tower is therefore materially increased and accurate fractionation made possible.

In the improved bubble tower of the invention the liquid enters each of the compartments, formed by any two successive pans or trays and the wall of the container in which they are supported, at approximately the same point in a vertical line and is required to pass entirely across the tray to the opposite side in a uniformly distributed stream, in contact with gases or vapors passing upwardly therethrough, and then to return in one or more streams in a similar manner to approximately that point at which it was originally received on the tray. The liquid is then conveyed to the next lower tray of the series and required to flow across this lower tray in a similar manner, the direction of flow being the same at all corresponding points in each successive tray. All parts of each successive tray are thereby made effective in causing intimate contacting of gas or vapor with liquid and a uniform difference in the composition of the liquid maintained at all corresponding points on any two trays.

The invention also provides a novel sectional bubble tray of cheap but rugged construction, whereby bubble trays of a number of sizes may be built up of sections all of which may be readily passed through the ordinary manhead and many of which are common to different sizes of tray. It is a further novel feature of the sectional construction of the improved bubble trays of the invention that the various sections may be so combined, although using many sections common to the different combinations, as to form bubble trays having a considerable range of area, substantially all parts of which are active, but which when assembled in series in a tower permit the relationship of liquid stream passing downwardly through the tower to the gas or vapor stream passing upwardly therethrough to be maintained approximately the same. The invention also provides novel means of maintaining a uniform liquid depth on bubble trays in which the liquid is required to travel an appreciable distance laterally over any one tray before it is conveyed to the next lower tray of the series. Other novel features of the bubble tower and bubble trays of the invention will be apparent from the following more detailed description.

A bubble tower and several modified forms of bubble trays embodying the invention are illustrated in the accompanying drawings and the invention will be further described in connection therewith, but it is intended and will be understood that while the invention is exemplified by the further description and illustration it is not limited thereto.

Figures 1, 2, 3:
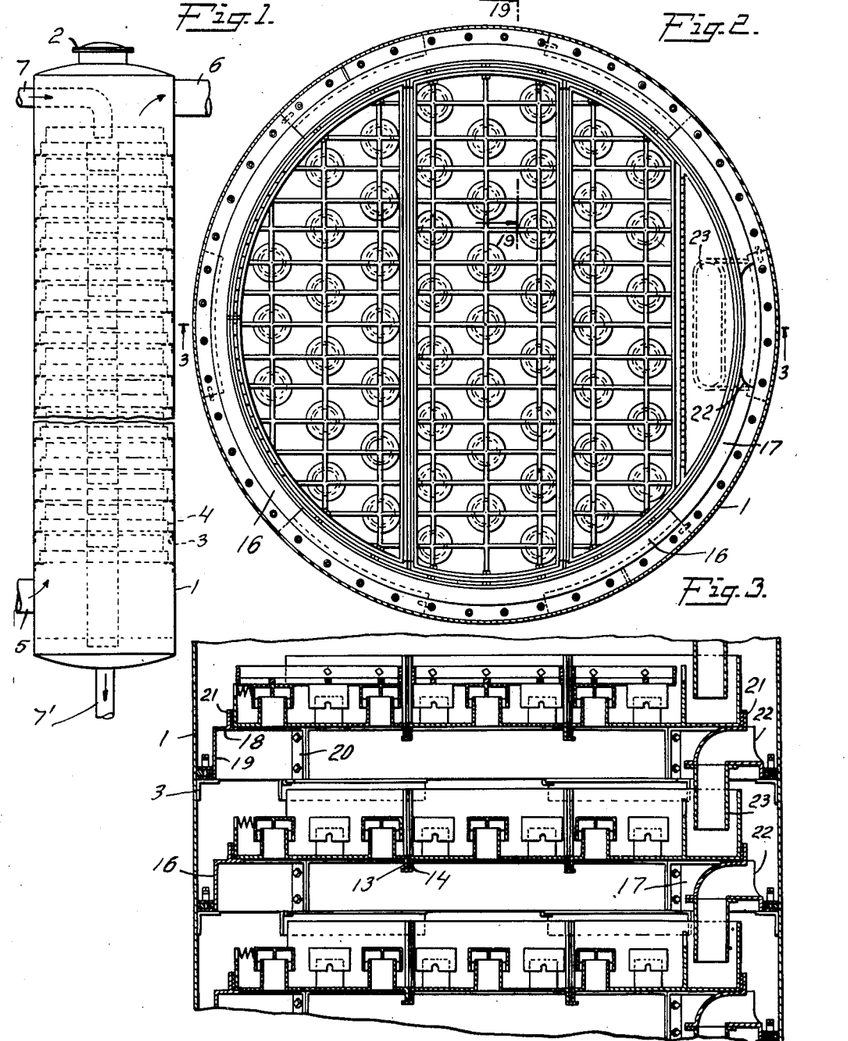
Fig. 1 is a diagrammatic representation in elevation of a bubble tower embodying the invention.
Fig. 2 is a plan view, partly in section, of a bubble tower embodying the invention which illustrates a complete bubble tray assembly of one form of bubble tray embodying the invention.
Fig. 3 is a section along the line 3—3 of Fig. 2.
Figure 4:
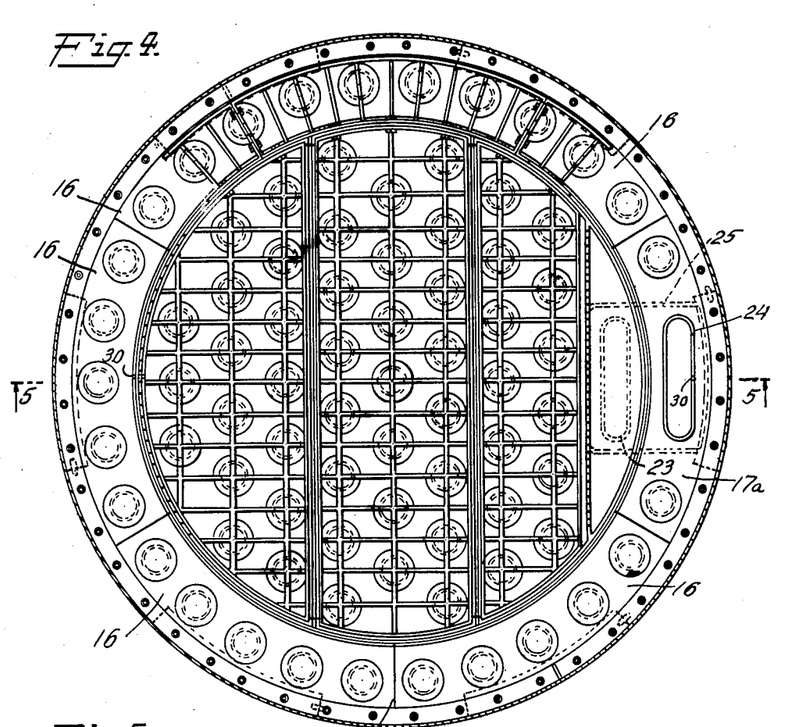
Fig. 4 is a plan view, partly in section and with parts broken away, of a bubble tower embodying the invention equipped with a slightly modified form of bubble tray.
Figure 5:
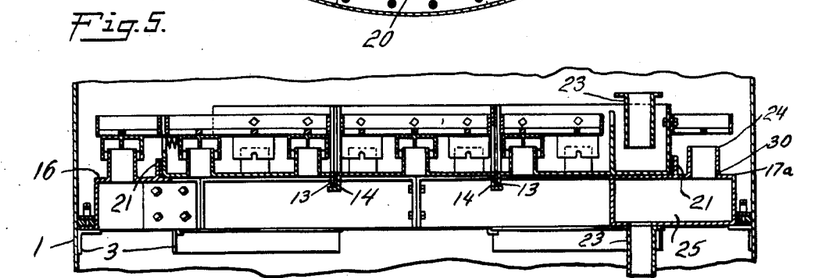
Fig. 5 is a section along the line 5—5 of Fig. 4.
Figures 6, 7:
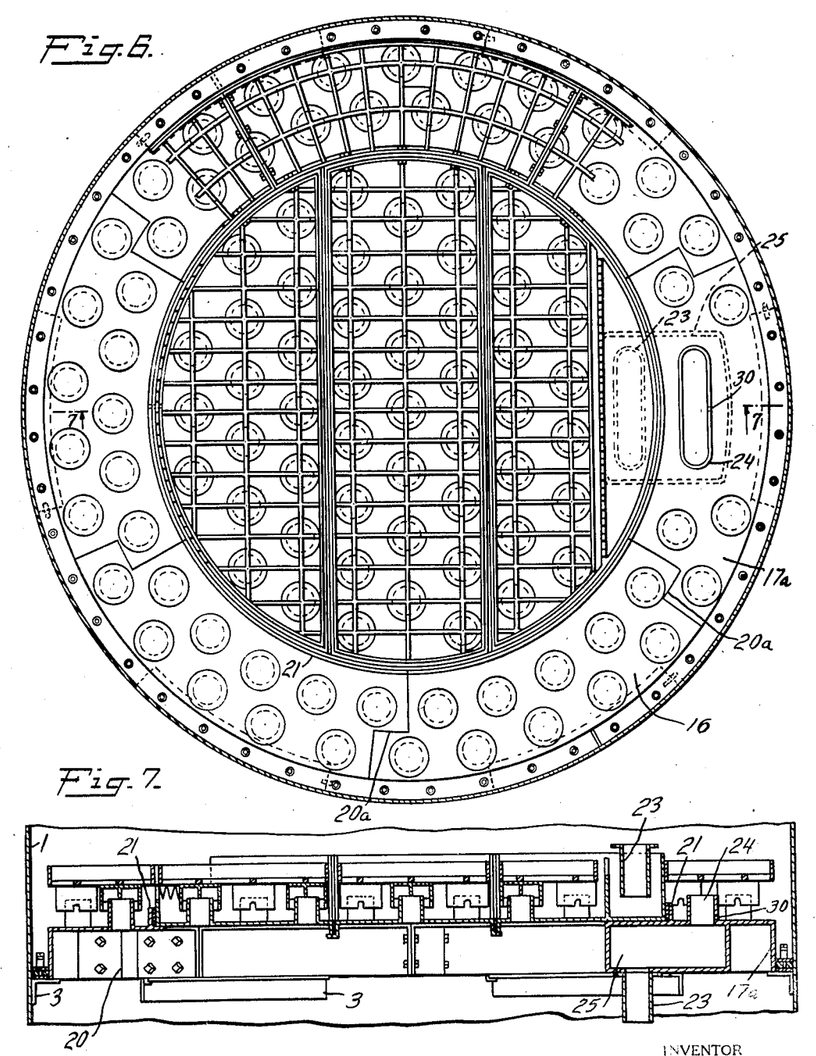
Fig. 6 is a plan view, partly in section, of a bubble tower embodying the invention equipped with another modified form of bubble tray.
Fig. 7 is a section along the line 7—7 of Fig. 6.
Figure 8:
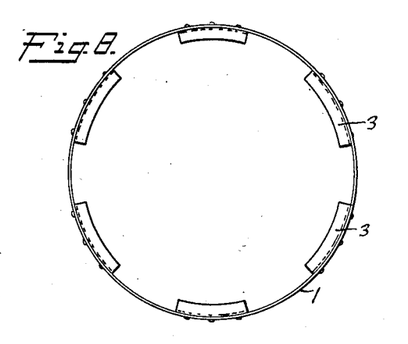
Fig. 8 is a plan view in section of a bubble tower shell showing the spaced supporting means for holding the trays in spaced relation therein.

Referring to Fig. 1, the tower diagrammatically illustrated consists of a vertical container or shell 1. A manhead 2 provides for access to the interior of the shell or container for inspection or repairs. The trays 4 may be inserted or removed in sections as desired through this manhead without necessitating the removal of the entire top of the container. Angle irons 3 are fastened to the interior wall of the shell in spaced relation to support the trays 4. Gas or vapor to be supplied to the tower for treatment may be introduced through connection 5 and any gas or vapor remaining unabsorbed or uncondensed, withdrawn from the tower through connection 6. Liquid may be supplied to the tower through connection 7 and drawn off, together with any constituents absorbed or condensed from the gas or vapors through connection 7'.

Figures 10, 11:
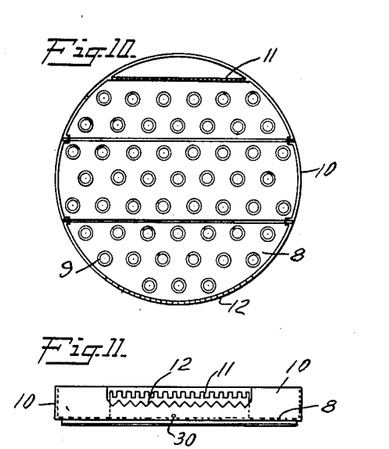
Figs. 10 and 11 are a plan view and elevation respectively, of the central sections of the bubble trays shown in Figs. 2 to 7 inclusive.

The several modified forms of bubble trays illustrated in Figs. 2 to 7 inclusive are all formed with a common central portion shown by itself in Figs. 10 and 11. Corresponding parts in each of the trays are designated by the same reference numerals in all of the figures. This central portion comprises a horizontal plate 8 having upwardly extending nipples 9 arranged therein in spaced relation adapted to have bubble caps placed thereover. A ring or baffle 10 extends upwardly from the outer edge of the plate around its entire circumference. A partition 11 is provided at one side of the plate, which is so arranged as to co-operate with the plate 8 and baffle ring 10 to form a reservoir or receiving means on the upper surface of the tray. The partition 11 is slightly lower than the baffle ring 10 so that it forms an overflow means from the receiving reservoir. The upper edge of this partition is preferably serrated in order to promote uniform distribution of the overflowing liquid. The baffle ring 10 is cut away at its upper edge on the side of the tray opposite the partition 11 to a slightly lower level than the top of the partition and the upper edge of the cut away portion may to advantage also be serrated. This lower portion of the baffle ring 10 is shown at 12 in Figs. 10 and 11. The portion of the baffle ring 10, which is of reduced height, forms the overflow means across which liquid on the upper surface of the plate is discharged, and the extent to which the height of the ring 10 is reduced at 12 may be regulated to maintain the desired liquid depth on the upper surface of the central portion of the tray independently of the liquid depth on the outer portion of the trays.

The central portion of the bubble trays may be in one piece, if so desired, and the top of the shell or container may be made removable to permit the entire center portion of the tray to be inserted or removed as an integral unit. In the form of bubble trays illustrated, however, the central portion is of sectional construction, which will permit all elements of bubble trays of very large diameters to pass through the ordinary manhead. The sections of the central portion, in the construction illustrated in the drawings, are provided with ribs 13 and 14 which serve to strengthen and increase the rigidity of the sections and to support an expansive packing material by means of which the sections may be sealed with each other. The vertical edges of the ring members in the sectional construction are provided with bosses 15 having a slightly concave face adapted to confine packing material placed between adjacent sections.

Figure 9:
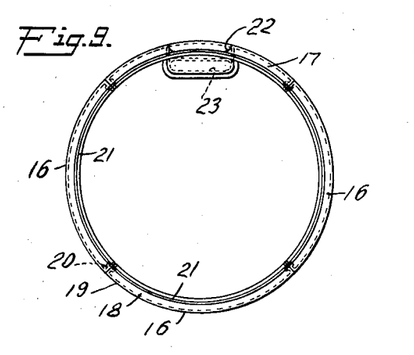
Fig. 9 is a plan view of the ring forming the outer portion of the bubble tray shown in Fig. 2.
Figure 15:
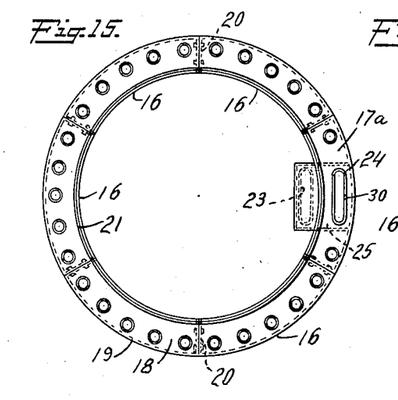
Figs. 15 and 16 are plan views respectively, of the outer ring sections of the bubble trays shown in Fig. 4 and Fig. 6 respectively.
Figure 16:
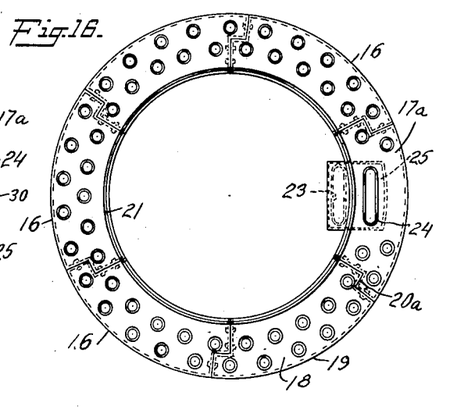

The outer ring portions of three different sizes of bubble trays are illustrated separately in Figs. 9, 15 and 16. The corresponding bubble tray assemblies are shown in elevation and partly in section in Figs. 3, 5 and 7 respectively. The outer ring portions of the bubble trays illustrated are built up of a plurality of sections 16 and 17. The ring sections 16 are composed of flat plates 18 in the form of a portion of an annular ring, the inside radius of which is slightly less than the outside radius of the central portion of the bubble tray, while the outside radius is slightly less than the inside radius of the shell or container but great enough to engage the angle irons 3 so as to support the trays in a horizontal position. The horizontal flat plate portions of the ring sections may or may not be provided with means for intimately contacting gas and liquid, such as upwardly extending nipples with bubble caps thereover, although the active area of the larger bubble trays may be materially increased thereby. These outer ring sections are provided with a downwardly extending rib or web 19 at the outer edge thereof which serves to stiffen the ring section and to provide a face parallel to the walls of the container adapted to coöperate with the walls of the container to laterally confine a packing material. The downwardly extending web may advantageously be continued radially across the end of the ring sections as shown at 20 and adjacent ring sections firmly attached to each other by bolts extending through this radial web. In the larger size bubble trays, such as that illustrated in Figs. 6, 7 and 16, where two or more rows of nipples and bubble caps are positioned radially in the outer ring section, the end of the ring sections may be step cut as shown at 20a in order to permit a more advantageous arrangement of the gas and liquid contacting means. The construction of the discharge ring sections 17 may be varied considerably, particularly with variation in the size of the bubble trays, and it will be noted that this discharge ring section is of a slightly different construction in each one of the three sizes of trays illustrated. All of the outer ring sections, however, are provided on their upper surfaces with an upwardly extending ring 21, the inside radius of which is slightly greater than the outside radius of the central portion of the bubble tray. The central portion of the bubble tray may be sealed with the outer ring portion by forcing an expansive packing material into the trough formed between the ring 21 on the outer ring member and the baffle ring 10 of the central portion of the tray.

In the bubble trays illustrated in Figs. 2 and 3, the corresponding outer ring portion of which is shown in Fig. 9, no gas and liquid contacting means are provided in the outer ring portion so that the liquid level on the outer ring portion is immaterial. The discharge section of the outer ring portion for such a bubble tray assembly, therefore, does not require a secondary overflow means. The discharge section 17 of the outer ring portion is arranged adjacent the receiving reservoir on the central portion of the bubble tray and is provided with an opening 22 communicating through the tray with a discharge member 23 which depends from the lower part of the bubble tray at a point within the circumference of the baffle ring 10 of the central portion of the tray and extends downwardly to a point below the normal liquid level in the receiving reservoir of the next lower bubble tray in the series. The discharge sections of the outer ring portion in the larger bubble trays 17a, such as that illustrated in Figs. 4 to 7 inclusive and 15 and 16, in which the outer ring section as well as the central portion of the tray is provided with gas and liquid contacting means, is provided with an overflow means 24, the height of which may be regulated to maintain the desired liquid level on the outer ring portion of the bubble tray independently of the liquid depth on the central portion of the tray. In the larger size bubble trays the discharge section may advantageously be constructed with a chamber 25 so arranged that the upper portion of the chamber coincides with and is an integral part of the upper surface of the discharge section. This chamber is provided, as shown, with an opening in the top communicating with the overflow means 24 positioned near the outer edge and beyond the ring 21, and an opening in the bottom near the inner edge corresponding in position to the receiving means on the central section of the tray immediately below it. As in the construction employed in the smaller size bubble trays, the larger size trays are also provided with a discharge member 23 extending downwardly to below the liquid level in the next lower tray of the series.

Figure 13:
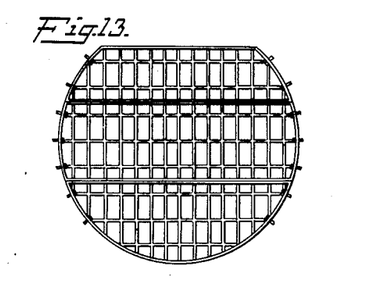
Fig. 13 is a plan view of the grid employed to hold the bubble caps in place on the central section of the tray shown in Fig. 10. This grid is shown in place in Figs. 2 and 3.
Figure 17:
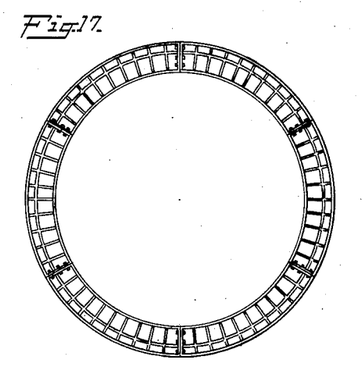
Figs. 17 and 18 are plan views of the grids adapted to hold the bubble caps in position, in the complete bubble tray assembly, on the outer ring sections shown in Figs. 15 and 16 respectively.
Figure 18:
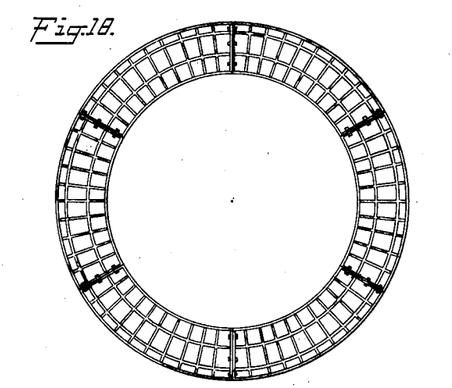

The baffle ring 10 at the outer edge of the central portion of the bubble trays may to advantage be drilled and a grid, such as that illustrated in Fig. 13, corresponding approximately to the shape of the active surface of the central portion of the tray attached to the upper edge of the baffle ring at the required height to hold the bubble caps placed over the nipples on the central portion of the tray firmly in place. In the larger size bubble trays where the outer ring portion is also provided with gas and liquid contacting means, the grid assemblies illustrated in Figs. 17 and 18 may be similarly attached to the ring member 10 of the central portion of the tray at the required height to maintain the bubble caps on the outer ring portions securely in place.

Figure 12:
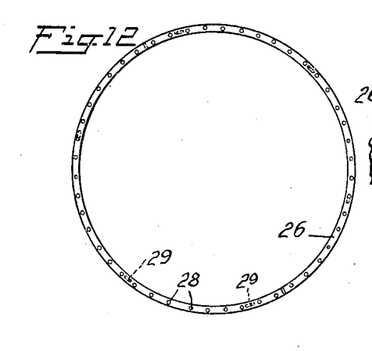
Fig. 12 is a plan view of the packing ring employed to seal the outer ring sections shown in Figs. 9, 15 and 16 with the inner wall of the container shown in Fig. 8.
Figure 14:
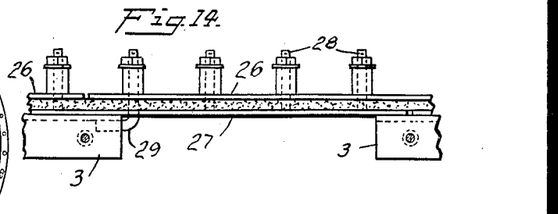
Fig. 14 is a fragmentary view in elevation of the packing ring shown in Fig. 12 to a greatly enlarged scale.
Figure 19:
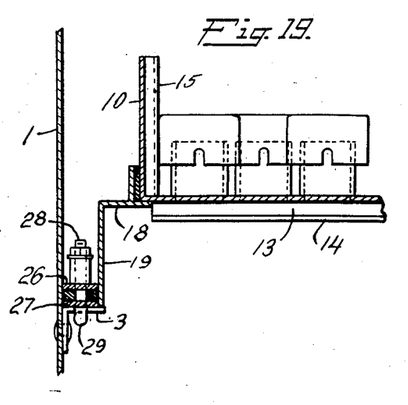
Fig. 19 is a fragmentary elevation in section taken along the line 19 of Fig. 2, showing in detail the method of sealing the outer ring section, shown in Fig. 9, with the wall of the container and with the central tray section, shown in Figs. 10 and 11.
Figure 20:
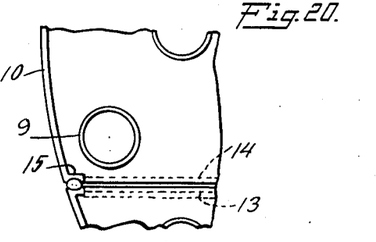
Fig. 20 is a fragmentary plan view to a greatly enlarged scale, showing details of the vertical connection between the sections of the central portion of the tray as shown in Fig. 10.

The outer ring section of the bubble trays may be sealed with the wall of the container in any suitable manner. One form of sealing ring is shown in detail in Figs. 12 and 14 while the enlarged detail of Fig. 19 shows the sealing ring with the bubble tray in place within the container. The construction of the ring here shown consists of two pairs of flat bars 26 and 27 arranged in the form of semi-circles. The lower bar is provided with upwardly extending stud bolts 28, provided with suitable nuts and spacers, fastened to their upper surface and lugs 29 having their lower portion bent approximately parallel to the ring secured to their lower surface. The lugs are spaced on the lower ring so as to register with the ends of the angle irons 3 on the inner wall of the container. The upper rings are drilled so as to register with the stud bolts extending upwardly from the lower ring with the holes so positioned that the joints between the two halves of the upper ring considerably overlap the two halves of the lower ring as illustrated in Figs. 12 and 14. A suitable packing material is inserted between the rings 26 and 27 so that on tightening the nuts on the stud bolts 28 the packing material is expanded laterally to form a seal between the downwardly extending ring 19 of the outer ring portion of the bubble trays and the wall of the container. Small holes 30 may to advantage be drilled near the bottom of the baffle ring 10 and the bottom of the overflow means 24 so that the tower may be readily drained when not in use.

In the operation of improved bubble tower of the invention gases or vapors are supplied at the bottom of the tower through connection 5 and pass upwardly through the tower contacting with the liquid streams flowing in the same direction across corresponding points in each of the trays in the series successively. Any unabsorbed or uncondensed gases or vapors remaining may be withdrawn through connection 6 and subjected to further treatment or conducted directly to suitable condensing or storage means.

Where a liquid is supplied from an external source to serve as an absorbing medium or assist the condensing operation it may be introduced to the top of the tower as desired through connection 7. Where the tower is operated as a simple reflux tower it is not necessary to supply additional liquid as reflux condensate and the cooling effect of heat transfer therefrom through the walls of the container may be relied upon entirely to produce an effective refluxing action.

In passing downwardly through the towers illustrated in the drawings the liquid which accumulates in the receiving means on each of the successive trays overflows the partition 11 and is uniformly distributed by the serrated upper edge of the partition. The liquid entering the central portion of the tray from the receiving means is directed by the baffle ring 10 and flows across the tray to the opposite side where it is discharged over the cut away portion 12 of the baffle ring to the outer portion of the bubble tray. The liquid then returns through the annular paths formed by the baffle ring 10, the walls of the container and the annular ring sections of the bubble tray to a point near the receiving means where it is discharged through the tray to the receiving means on the next lower tray of the series.

Where the outer ring portion as well as the central portion of the bubble tray is provided with means for permitting the flow of gases or vapors upwardly therethrough and for intimately contacting such gases or vapors with the liquid on the upper surface of the tray, the level of the liquid on the central portion of the tray may be maintained substantially constant by the height of the cut away portion of the baffle ring 10, while the liquid level on the annular ring portion the upper surface of which, in the type of construction shown is at a lower level than the upper surface of the central portion of the tray, may be independently maintained at a lower level by the operation of the overflow means 24. The advantage of such construction, particularly when operating a tower of large diameter at either exceptionally high or exceptionally low capacity will be apparent, for while the length of the path of liquid travel laterally on any one bubble tray may be great a relatively rapid flow of liquid may be nevertheless maintained when operating a high capacity and a relatively slow liquid flow when operating a low capacity, without excessive variation in the depth of the liquid, at any portion of the tray. The tower may therefore be operated under conditions approximating those of maximum efficiency at both high and low capacities.

The bubble trays of the invention also promote a more uniform distribution of the liquid, particularly in bubble trays of large active area, than it is possible to obtain with the ordinary type of bubble tray construction.

I claim:

1. An improved bubble tower comprising a vertically arranged container having a series of trays supported therein in spaced relation, said trays being sealed with the walls of the container so as to form a series of compartments intermediate successive trays, means for receiving a liquid at corresponding points in a vertical line on the upper surface of each of said trays, baffles on the upper surfaces of each of said trays arranged to co-operate with said trays and the walls of the container to flow liquid across the central portion of said trays in one direction and in annular paths across the outer portion of the trays in the opposite direction, means for contacting liquid on the upper surface of said trays in the central portion and in the annular paths with a gas or vapor passing upwardly therethrough, and discharge means arranged to convey liquid through each of said trays to the receiving means for the next lower tray of the series.

2. An improved bubble tower comprising a vertically arranged container having a series of trays supported therein in spaced relation, said trays being sealed with the walls of the container so as to form a series of compartments intermediate successive trays, means for receiving a liquid at corresponding points in a vertical line on the upper surface of each of said trays, baffles on the upper surfaces of each of said trays arranged to co-operate with said trays and the walls of the container to flow liquid across the central portion of said trays in one direction and in annular paths across the outer portion of the trays in the opposite direction, means for contacting liquid on the upper surface of said trays in the central portion and in the annular paths with a gas or vapor passing upwardly therethrough, discharge means adapted to convey liquid which has passed twice across said trays to the receiving means on the next lower tray of the series, said receiving and discharge means being arranged to co-operate with said baffles to maintain the flow of liquid in the same direction at corresponding points on the upper surfaces of successive trays in the same direction.

3. An improved bubble tower comprising a vertically arranged container having a series of trays supported therein in spaced relation, said trays being sealed with the walls of the container so as to form a series of compartments intermediate successive trays, means for receiving liquid on the upper surface of each of said trays, baffles on the upper surface of each of said trays arranged to cooperate with the trays and the walls of the container to flow liquid across the central portion of said tray in one direction and in annular paths across the outer portion of the tray in the opposite direction, means for contacting liquid on the upper surfaces of said trays in the central portion and in the annular paths with a gas or vapor passing upwardly therethrough, means adapted to co-operate with said baffles to maintain a fixed liquid level in the central portion of said trays and means adapted to co-operate with the walls of said container to maintain a different liquid level in the annular paths and discharge means for conveying liquid through each of said trays to the receiving means for the next lower tray of the series.

4. In gas and liquid contact apparatus, an improved bubble tray adapted to be supported in a vertical container comprising a central section having a baffle on the upper surface and near the outer edge thereof in combination with an annular ring adapted to extend between said central section and the walls of said container and means for contacting liquid on the upper surface of said central section and said annular ring with gases or vapors passing upwardly through said central section and said annular ring.

5. In gas or liquid contact apparatus, an improved bubble tray adapted to be supported in a vertical container comprising a central section having a baffle on the upper surface and near the outer edge thereof in combination with an annular ring adapted to extend between said central section and the walls of said container and means for contacting liquid on the upper surface of said central section and said annular ring with gases or vapors passing upwardly therethrough, an overflow means adapted to co-operate with said baffle to maintain a fixed liquid level on the upper surface of said central section and a different liquid level on the upper surface of said annular ring.

6. In gas and liquid contact apparatus, an improved bubble tray adapted to be supported in a vertical container comprising a central portion having a baffle on the upper surface thereof in combination with an annular ring comprising a series of sections adapted to be joined together and to support said central section, means for sealing said central section with the annular ring, liquid receiving means on the upper surface of said bubble tray and discharge means adapted to convey liquid from the upper surface through said tray to the lower side thereof.

7. In gas and liquid contact apparatus, an improved bubble tray adapted to be supported in a vertical container comprising a separate central portion composed of a plurality of sections and having a baffle on its upper surface on the outer edge thereof in combination with an annular ring adapted to extend between the outer edge of said central portion and the walls of said container and to support said central section in said container, and means adapted to co-operate with said annular ring to seal the sections of said central portion with each other and with said annular ring.

8. An improved bubble tower comprising a vertically arranged container having a series of trays supported therein in spaced relation, said trays being sealed with the walls of the container so as to form a series of compartments intermediate successive trays, baffles on the upper surfaces of said trays arranged to direct the flow of liquid across the upper surface thereof, means for contacting liquid flowing across the upper surface of portions of each of said trays with a gas or vapor rising upwardly therethrough said portions of the trays comprising the active portions thereof, overflow means adapted to cooperate with said baffles to maintain different liquid levels over different active portions of the trays, receiving means on the upper surface of each of said trays and discharge means for conveying liquid through each of said trays to the receiving means for the next lower tray of the series.

9. An improved bubble tray for gas and liquid contact apparatus comprising a horizontally arranged plate adapted to be supported in a vertically arranged container, means for receiving a liquid from a point above said plate, means for contacting liquid on the upper surface of portions of said plate with a gas or vapor passing upwardly therethrough said portions of the plate comprising the active portions thereof, a baffle on the upper surface of said plate arranged to direct a flow of liquid over said tray and a plurality of overflow means adapted to cooperate with said baffle to maintain different liquid levels over different active portions of the bubble tray.

In testimony whereof I affix my signature.

CLIVE M. ALEXANDER.